(No Model.) 2 Sheets—Sheet 1.
C. C. BRADLEY & T. FAULDER.
SHIFTING SEAT FOR VEHICLES.
No. 519,832. Patented May 15, 1894.
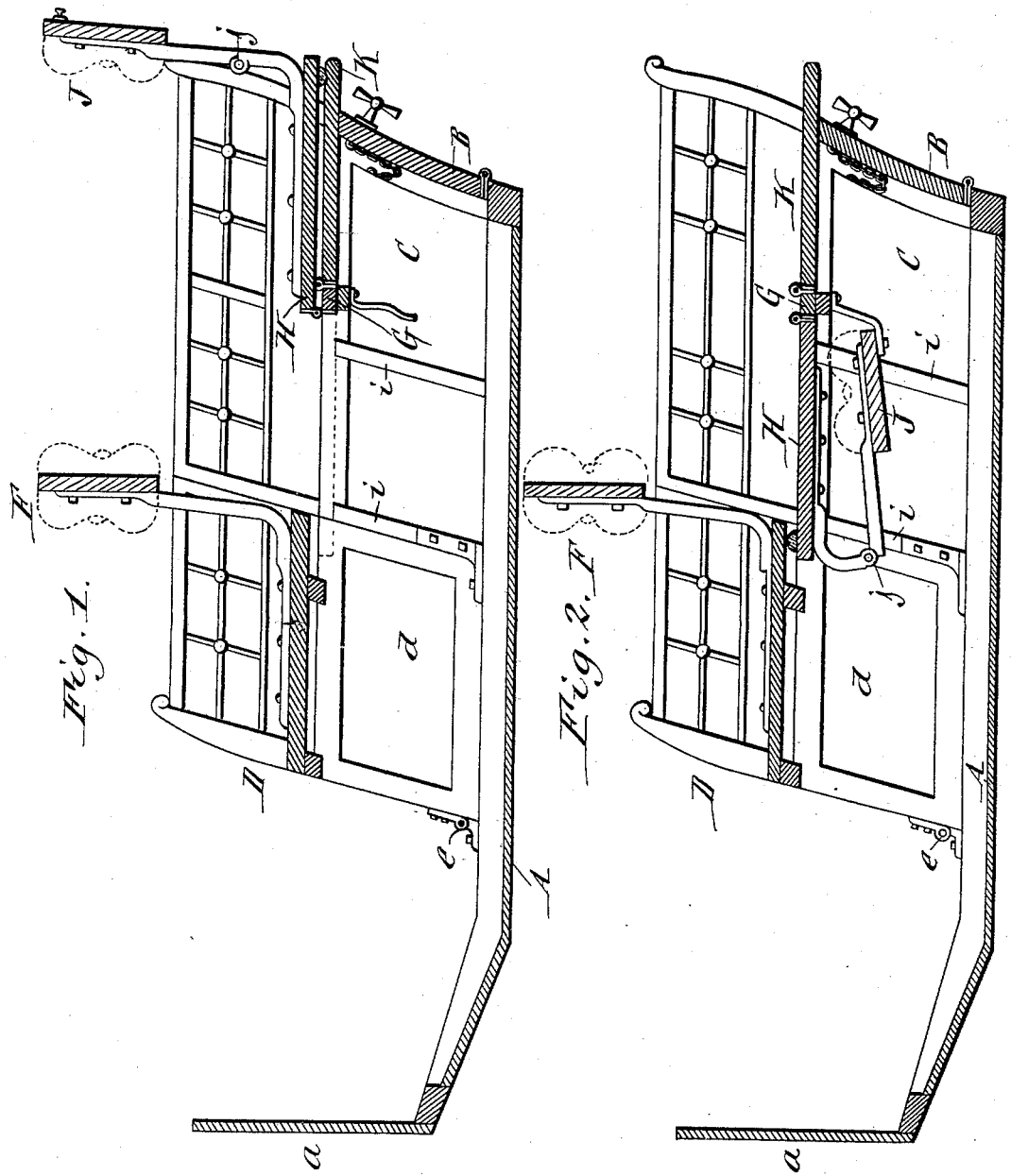
Witnesses:
F. Gutev-Wilhelm.
Theo. L. Popp.
C. C. Bradley
Thos. Faulder  Inventors
By Wilhelm Bonner
Attorneys.

(No Model.) 2 Sheets—Sheet 2.
C. C. BRADLEY & T. FAULDER.
SHIFTING SEAT FOR VEHICLES.
No. 519,832. Patented May 15, 1894.
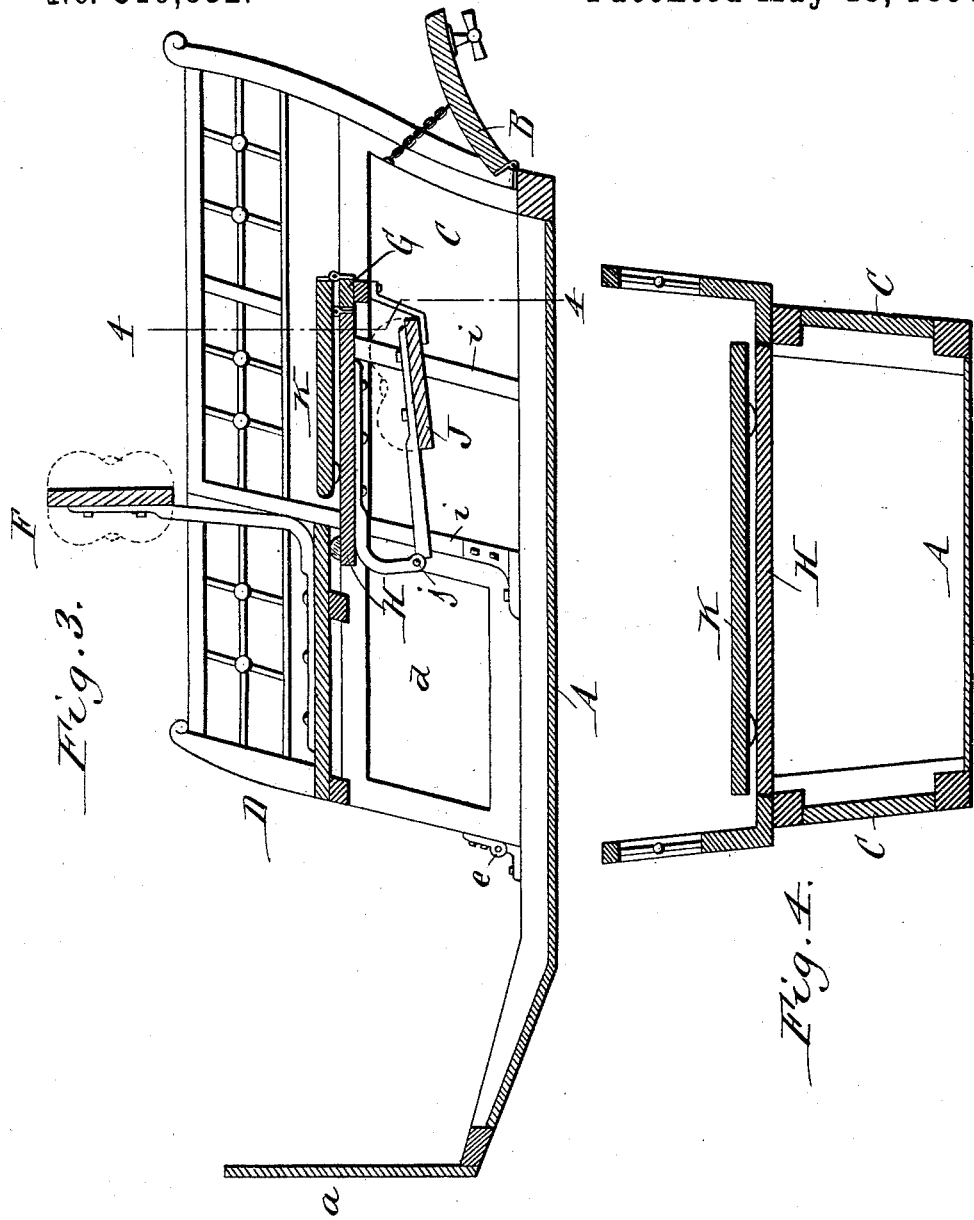
Witnesses:
F. Gustav Wilhelm.
Theo. L. Popp.
C. C. Bradley,
Thos. Faulder, Inventors
By Wilhelm Bonner
Attorneys.

UNITED STATES PATENT OFFICE.

CHRISTOPHER C. BRADLEY AND THOMAS FAULDER, OF SYRACUSE, NEW YORK; SAID FAULDER ASSIGNOR TO SAID BRADLEY.

SHIFTING SEAT FOR VEHICLES.

SPECIFICATION forming part of Letters Patent No. 519,832, dated May 15, 1894.

Application filed July 24, 1893. Serial No. 481,285. (No model.)

*To all whom it may concern:*

Be it known that we, CHRISTOPHER C. BRADLEY and THOMAS FAULDER, both citizens of the United States, residing at Syracuse, in the county of Onondaga and State of New York, have invented new and useful Improvements in Shifting-Seat Vehicles, of which the following is a specification.

This invention relates to that class of vehicles which are provided with shifting seats and has the object to provide a vehicle which has a front seat and two shifting rear seats, so that by adjusting the seats, the vehicle can be used as a one-seated vehicle, a two-seated vehicle with both seats facing forwardly, or a two-seated vehicle with the seats arranged dos-a-dos, the construction and arrangement of the rear seats being such that they can be folded down, when not required for use, one behind the other to form a deck in rear of the front seat.

In the accompanying drawings consisting of two sheets:—Figure 1 is a longitudinal sectional elevation of our improved vehicle arranged with two seats facing forwardly. Fig. 2 is a similar view showing only the front seat in use. Fig. 3 is a similar view showing the vehicle with two seats arranged dos-a-dos. Fig. 4 is a cross section of the vehicle in line 4—4, Fig. 3.

Like letters of reference refer to like parts in the several figures.

A represents the bottom of the body, a the dash board, B the tail board hinged with its lower end to the body, and C the side panels which are rigidly secured to the bottom and extend forwardly from the tail board.

D represents the front seat which is provided with side panels d forming a forward continuation of the fixed side panels of the body when the front seat is in its normal position. The side panels of the front seat are attached at their lower front corners to the bottom or its sills by hinges e, so that the front seat can be tilted forwardly, to afford access to the rear seat from the front.

F is the back of the front seat which is rigidly secured thereto.

G represents a cross bar which connects the upper portions of the fixed side panels of the body about midway between the front seat and the tail board.

H represents the forwardly-facing rear seat which is hinged to the front side of the cross bar G in such manner that it can be swung backwardly into its operative or forwardly facing position, as represented in Fig. 1. When this seat is swung forwardly or closed down into its inoperative position, it rests upon the upper ends of standards i secured to the inner sides of the body panels, as represented in Figs. 2 and 3.

J represents the back of the forwardly-facing rear seat which is attached to the seat by hinges j so that it can be folded down upon the seat.

K represents the backwardly-facing rear seat which is hinged to the rear side of the cross bar in such manner that it can be swung forwardly into its operative or backwardly facing position, as represented in Fig. 3, or swung backwardly into its inoperative position, as represented in Figs. 1 and 2. When this rear seat is in its inoperative position the tail board is raised and the seat rests upon the same or extends over the same, as represented in Figs. 1 and 2. When this seat is in its operative position it rests upon the reverse side of the forwardly facing rear seat and the tail board is swung down, as represented in Fig. 3, to serve as a foot rest for the rearwardly facing passengers occupying the rear seat. When the front seat only is in use, as represented in Fig. 2, the two rear seats are folded down, exposing their reverse sides, and form with the cross bar a deck which completely closes the top of the vehicle in rear of the front seat. The back of the front seat serves also as a back for the rearwardly facing rear seat when the latter is in its operative position.

The front seat is preferably arranged slightly higher than the rear seats so as to lap over the forwardly-facing rear seat when the latter is folded down.

We claim as our invention—

1. The combination with the vehicle body, of a front seat, a forwardly facing rear seat and a rearwardly facing rear seat, both rear seats being hinged to the upper portion of the body, one behind the other, and adapted to fold into a horizontal position, when not in use, and form a deck in rear of the front seat, substantially as set forth.

2. The combination with the vehicle body, of a front seat, a forwardly facing rear seat hinged at its front end to the body to fold forwardly into a horizontal position, and a rearwardly facing rear seat hinged at its rear end to the body to fold backwardly into a horizontal position, whereby either rear seat, when in use, is arranged horizontally over the rear seat which is not in use, while both rear seats, when not in use, are folded down into a horizontal position and form a deck in rear of the front seat, substantially as set forth.

3. The combination with the vehicle body, of a front seat hinged to the body to tilt forwardly, a cross bar secured to the body, a seat hinged to said cross bar to fold forwardly, and a seat hinged to said cross bar to fold backwardly, substantially as set forth.

4. The combination with the vehicle body, of a front seat hinged to the body to tilt forwardly, a tail board hinged to the rear end of the body, a cross bar secured to the body between the front seat and the tail board, a seat hinged to said cross bar to fold forwardly, and a seat hinged to said cross bar to fold backwardly, substantially as set forth.

Witness our hands this 17th day of July, 1893.

CHRISTOPHER C. BRADLEY.
THOMAS FAULDER.

Witnesses:
C. W. SMITH,
C. C. BRADLEY, Jr.